Inventor:
WARREN H. PRICE

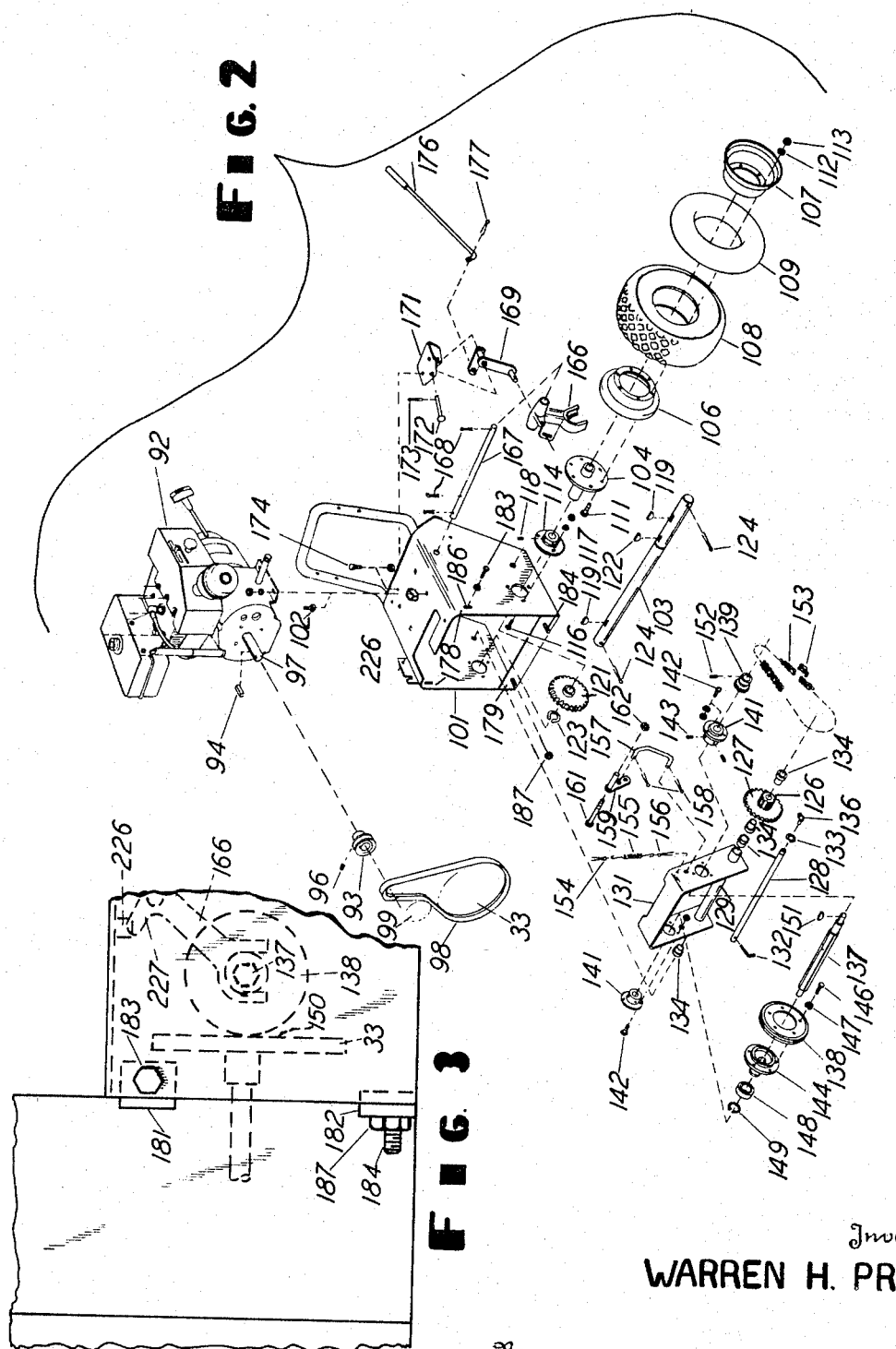

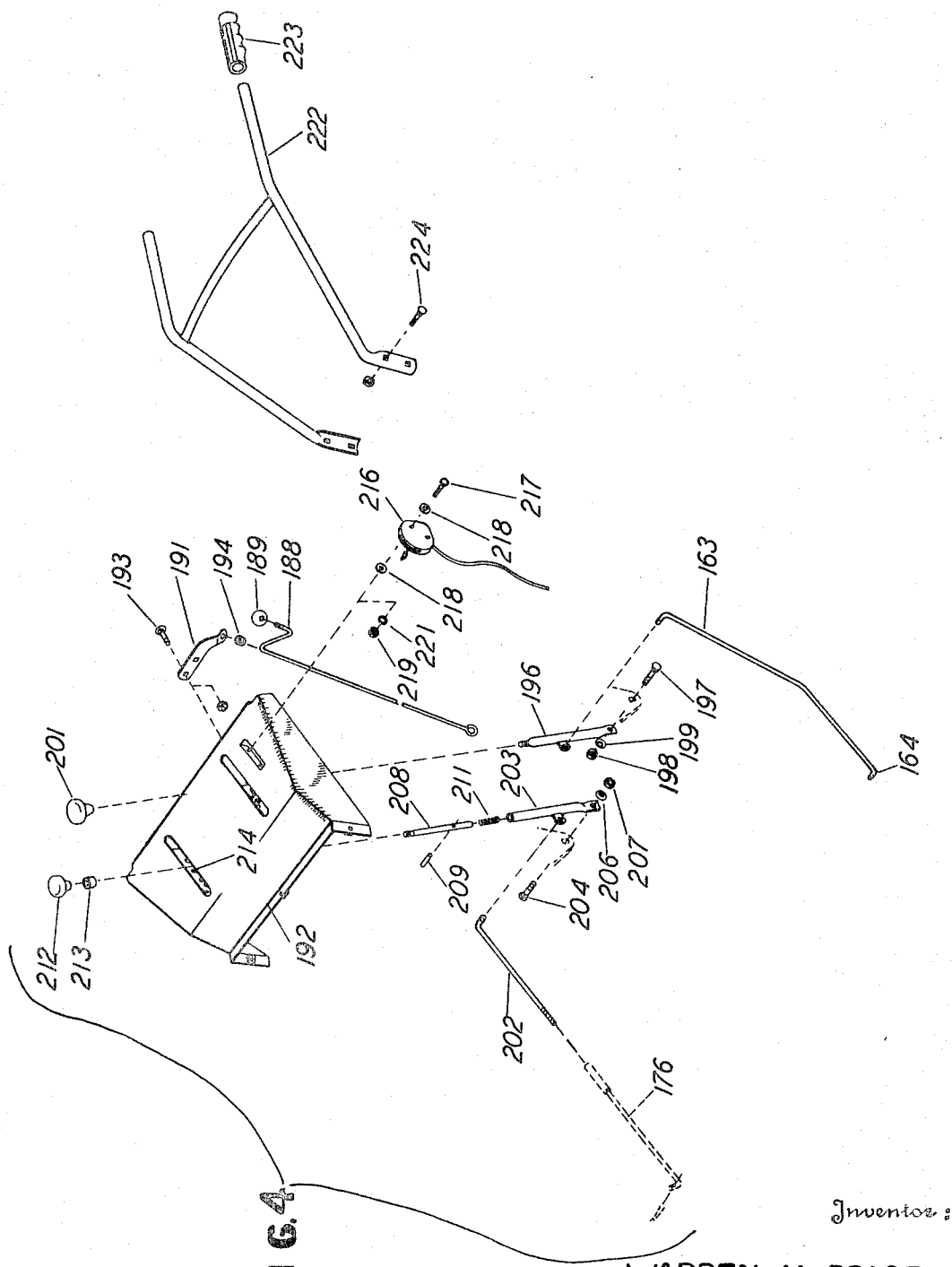

United States Patent Office 3,334,429
Patented Aug. 8, 1967

3,334,429
POWER UNIT AND IMPLEMENT
ATTACHMENT
Warren H. Price, South Milwaukee, Wis., assignor to Jacobsen Manufacturing Company, Racine, Wis., a corporation of Wisconsin
Filed Aug. 28, 1964, Ser. No. 392,729
5 Claims. (Cl. 37—43)

ABSTRACT OF THE DISCLOSURE

A powered implement having a prime mover with a support therefor, and an attachment to the support and carrying a working implement. The implement includes a disc rotated by the prime mover, and the support includes ground wheels. A drive wheel is in rolling contact with the disc and is connected to the ground wheels for driving the latter. Control means connect to the drive wheel for moving it relative to the disc to control the displacement of the entire implement.

---

This invention relates to a powered implement, and more particularly it relates to a combined power unit and powered attachment.

It is an object of this invention to provide a powered implement such as a snow blower or a lawn mower which is of a heavy duty type, but nevertheless transmits the drive from the prime mover to the implement in an improved and efficient manner. In accomplishing this particular object, the prime mover may be a gasoline engine which drives both the traction wheels and the implement of the unit and the wheels and the implement are connected to controls such as clutch controls for separate drive control of the wheels and implement.

Another general object of this invention is to provide a combined power unit and attachment which has a working implement for snow removal, lawn mowing, or the like, and wherein the attachment may be readily and easily attached and detached with respect to the base unit though of course the attachment carries the rotating or otherwise movable type of implement. In accomplishing this particular object, the drive connection between the base unit and the rotating implement is arranged to permit ready and easy interchange of various attachments such as those indicated, and the attachments are all driven in an efficient manner though the connection is readily and simply accomplished.

Still another object of this invention is to provide a combined power unit and implement attachment wherein the unit has traction wheels which are controlled in both speed and forward and reverse directions and wherein the unit has a common prime mover for both the traction wheels and the powered implement.

Still another object of this invention is to provide a combined implement attachment and power unit with traction wheels and with the transmission of power from the prime mover to the driven parts being adjustable in an improved and efficient manner with respect to heretofore known transmission, and with the transmission being safe both from the standpoint of the operator and the wear and tear on the unit itself. In accomplishing this particular object, the unit is specifically arranged so that it cannot be placed in a so-called neutral position which would nevertheless permit the moving parts to operate and become worn while no drive is being transmitted.

Other objects and advantages become apparent upon reading the following description in light of the accompanying drawings, wherein:

FIG. 2 is an exploded view of the power unit including the gasoline engine prime mover, with the unit being attachable to the attachment shown in FIG. 1.

FIG. 3 is an enlarged side elevational view of a fragment of the showings in FIGS. 1 and 2, and showing the two attached.

FIG. 4 is an exploded view of the controls and the like which are attached to the unit shown in FIGS. 1 and 2.

Figure 1:
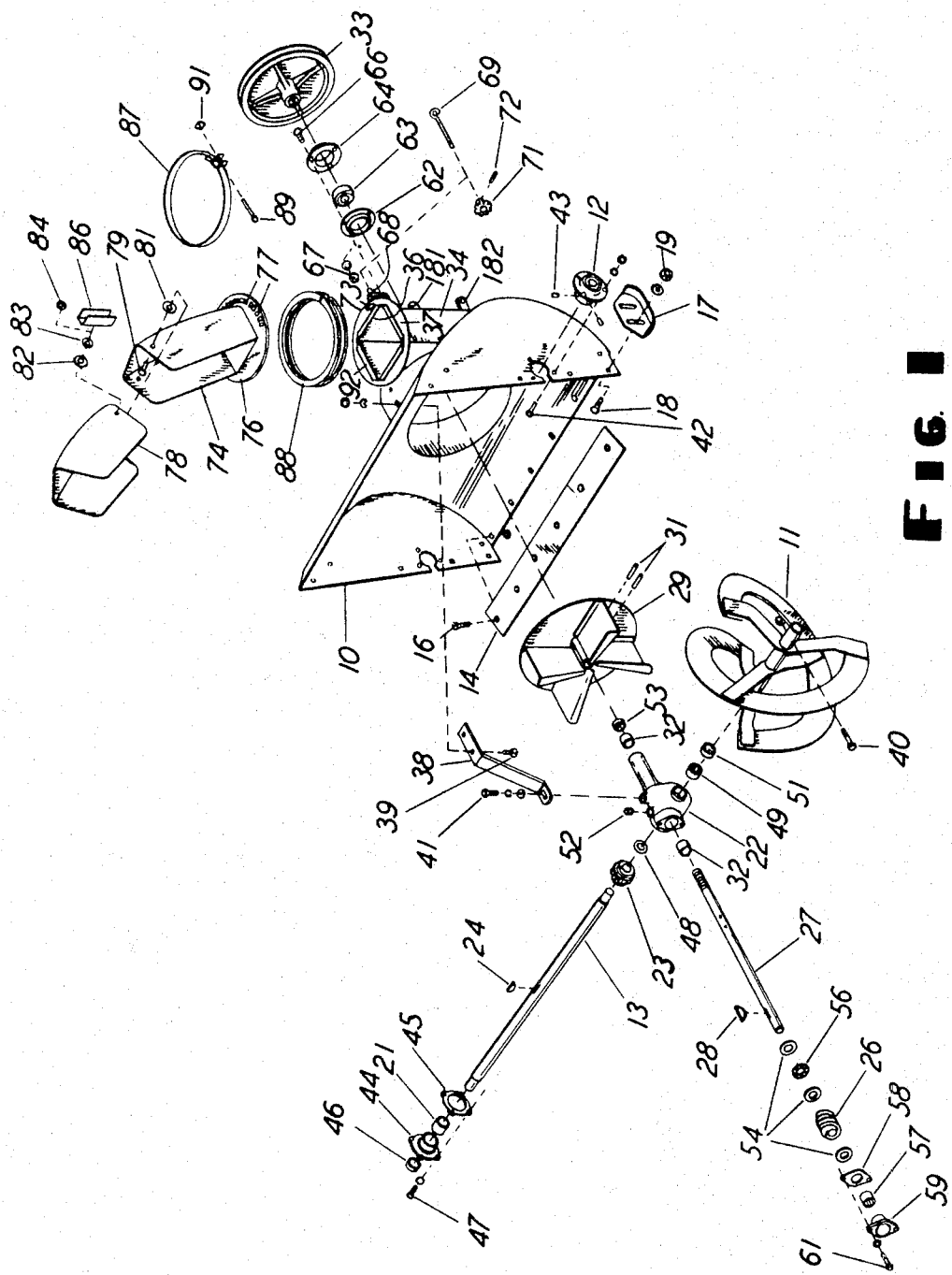
FIG. 1 is an exploded view of a snow blower attachment useful in embodying this invention.

This invention has particular application to a snow blower, and accordingly FIG. 1 shows the snow blower attachment.

FIG. 1 shows the general arrangement of the pickup section of a snow blower with the auger housing 10 and the auger 11 which would of course be rotatably disposed within the housing 11 by means of the bearing 12 on each end of the auger shaft 13. The housing 10 also has a scraper blade 14 secured by means of screws, such as the screw 16, and the housing is supported on a skid 17 secured by bolts and nuts, such as the bolt 18 and nut 19.

The auger shaft 13 of course extends into the auger 11 and is supported in the bearing 12 and the bearing 21. Shaft 13 also extends through the gear housing 22, and the worm wheel 23 is secured to the shaft by the key 24 to be driven by the worm 26 secured to a shaft 27 by a key 28. Also a fan 29 is secured to the shaft 27 by the pins 31 which extend into the shaft 27 as the latter is rotatably mounted in the housing 22 by the bearings 32. The shaft 27 is threaded into a driven pulley 33 which is a disc powered by a prime mover which is generally a gasoline engine.

Thus it will be understood that the pulley 33 rotates the shaft 27 which in turn rotates the blower 29 and the auger shaft 13 and its auger 11 so that snow is picked up by the auger 11 and is passed to the blower 29 and thus is passed into the auger housing portion 34 which has its upright opening 36 extending therein and which terminates in a plate 37. The gear housing 22 is supported on the auger housing 10 by means of a bracket 38 secured by bolts, such as the bolt 39, to the housing, and secured by a screw 41 which connects to the gear housing.

Other shown details of the general arrangement include bolts, such as the bolt 42, and screws, such as the screw 43, for mounting the bearing 12. Auger bolt 40 is also shown and gasket 45, housing cover 44, seal 46, and screw 47 are shown on the far end of the shaft 13. A washer 48 and bearing 49 and seal 51 are also shown, to be mounted on the shaft 13. The gear housing 22 has a plug 52.

The shaft 27 has a seal 53 and washers 54 and a bearing 56 and another bearing 57 and a gasket 58. An end cover 59 is provided for the end of the shaft 27 and is assembled with screws, such as the screw 61. The shaft 27 also has mountable thereon a flange 62 and a bearing 63 which is intermediate another flange 64, with these parts being secured by bolts, such as the bolt 66, and nuts, such as the nut 67.

The housing portion 34 has mounted thereon a sleeve 68 which rotatably receives the hooked rod 69 which in turn has a sprocket 71 to be secured thereto by a pin 72. It will therefore be understood that the rod 69 is rotated by a suitable crank or like control means, so that the rod 69 rotates and in turn rotates the sprocket 71. The sprocket projects through a substantially rectangular opening 73 in the flange 37 of the housing.

A chute 74 is disposed over the housing portion 34 and has a flange 76 which mates with the flange 37, and the chute 74 is rotatable over, and with respect to, the stationary housing flange 37. The means for rotating is the sprocket 71 which engages sprocket openings 77 in the chute plate 76. A deflector 78 is movably mounted on the upper end of the chute 74 by means of the pivot bolt 79, which has a washer 81, and is secured by the nut 82, a washer 83, and a nut 84 which secures a wing-nut type of member 86.

A tension band 87 encircles a retaining member 88 which engages the flanges 37 and 76 in a manner described hereinafter. The band 87 secures the retaining member to the flanges, and a bolt 89 and nut 91 are connected to the band 87 for the securing function mentioned.

FIG. 2 shows the power unit or base unit and it includes the prime mover which is shown to be a gasoline engine designated 92. A pulley 93 is mountable on the engine shaft to be driven thereby by means of a key 94, and a set screw 96 retains the pulley axially on the engine shaft 97. A belt 98 can thus be trained on the pulley 93, and the drive pulley 33 is indicated also to be trained with the belt 98, and an idler pulley 99 is further indicated. The engine 92 is mountable on a frame or support means 101 and is secured thereto by means of screws, such as the screw 102.

The frame 101 receives an axle 103 which in turn supports a complete wheel consisting of the hub 104, the inner rim 106, the outer rim 107, the tire 108, and the inner tube 109, all of which are secured together by bolts and washers and nuts such as the bolt 111, washer 112, and nut 113. A bearing 114 is secured to the side of the support means 101 by means of bolts and nuts, such as the shown bolt 116, and the nut 117. Set screws 118 maintain the bearing on the axle. Of course there is a wheel assembly on each side of the support means and they serve as ground or traction wheels in the usual and well-known manner and are powered as hereinafter described. The hub 104, and the similar bearing on the other end, are secured to the axle 103 by the keys 119.

A gear 121 is mountable on the axle 103 and is secured thereto by a key 122. The gear is axially fixed with the axle 103 by the snap-ring 123. Cotter pins 124 also secure the assembly on the axle 103.

The axle 103 and thus the assembly wheels are driven by meshing the gear 121 with a gear 126 which has a sprocket 127 connected thereto. The gear and sprocket assembly is mounted on the shaft 128 which is rotatable in a sleeve 129 in a bracket 131. The latter is rockably mounted in the support means 101 in the position indicated, and a pin 132 holds one end of the shaft 128 in the support means 101 along with the bracket 131, and a snap-ring 133 holds the other end therein. Also bushings 134 rotatably support the shaft 128, and a grease fitting 136 is shown to be mountable on the end of the shaft 128.

A hex shaft 137 is also rotatably mounted in the bracket 131 and supports a drive wheel 138 and a drive sprocket 139. Bearings 141 rotatably support the shaft 137 on the bracket 131, and the bearings are secured thereto by screws, such as the screw 142. Also set screws, such as the set screw 143, secure the bearing to the shaft.

A hub 144 is mounted on the shaft 137 and attaches to the wheel 138 through screws and lock washers, such as the screw 146 and lock washer 147. Also a bearing 148 and snap-ring 149 are mountable on the shaft 137 to secure the assembly of the drive wheel 138. A key 151 and a set screw 152 secure the sprocket 139 to the shaft 137. Finally a chain 153 extends between the sprocket 139 and the sprocket 127 to transmit the drive therebetween and thus rotate the drive wheel 138.

FIG. 3 shows the assembly between the attachment of FIG. 1 and the power unit of FIG. 2, and here it will be noted that the pulley 33 and the drive wheel 138 are in rolling contact as the latter is offset with respect to the axis of the pulley 33 so that rotation of the pulley will of course transmit rotation to the wheel 138. Since wheel 138 is mounted on hex shaft 137, and hub 144 is also shaped to be in rotational driving relation with the shaft 137, the shaft 137 will rotate and of course rotate the sprocket 139 which in turn drives the sprocket 127 and gear 126. The latter thus meshes with the gear 121 on the axle shaft 103 to drive the traction wheels.

The wheel 138 is of a rubber material round its circumference for the drive relationship mentioned, and it is spring urged into rolling contact with a flat face 150 on one side of the disc or pulley 33 by means of the spring 155 which is secured to the support means 101 by a cotter pin 154 and which is secured to the bracket 131 by a cotter pin 156. The spring thus urges the drive wheel 138 into contact with the disc 33 as mentioned. Also, the wheel 138 is shiftable along the shaft to permit selectable speeds for the drive wheel and to permit forward and reverse rotation of the wheel. Thus a link 157 is connected to the bracket 131 by its end and is secured by cotter pins 158 to the bracket 131 and a link 159. The link 159 is mounted on the support means 101 by a bolt 161 and a nut 162. Thus the links 157 and 159 provide a connection to the bracket 131 for withdrawing the bracket against the spring 155 and thereby withdrawing the drive wheel 138 from the disc 33. FIG. 4 shows a control rod 163 with the lower end 164 which extends to the link 159 and connects therewith for the control of the bracket 131 as mentioned.

Upon withdrawal of the drive wheel 138, it may then be shifted along the shaft 137. For this, a fork 166 is slidably mounted on the support means 101 through the shaft 167 secured to the support means by the cotter pins 168. The lower end of the fork 166 engages the bearing 148 mountable on the hub 144 to transmit the shifting of the fork 166 to the wheel 138 as desired. A linkage 169 connects to the fork 166 and is supported on the support means 101 through a support 171 which carries a clevis pin 172 having a cotter pin 173 for attachment to the support 171. A bolt and nut assembly 174 secures the support 171 to the support means 101.

Actuation of the linkage 169 is accomplished by a rod 176 which connects to the linkage 169 and is secured thereto by a cotter pin 177. Axial displacement of the rod 176 will pivot the lower end of the linkage 169 about the axis of its mounting pin 172 and thereby displace the fork 166 along the shaft 137.

FIGS. 2 and 3 show the support means 101 and the attachment have mating matching portions 178 and 179, on the support means 101, and 181 and 182 on the attachment. These portions of course abut or mate with each other as shown in FIG. 3, and bolts 183 and 184 extend between the portions as the bolts 183 pass through slots 186 in the support means 101 for instance. Nuts, such as the shown nut 187, secure the units together. It is important to note particularly in FIG. 3 that when the portions which mate together as described are mated and connected together, then the pulley 33 and drive wheel 138 are in rolling contact when the drive wheel controls are placed in a position for contact. This arrangement therefore permits for simple and easy attachment and transmission of power from the prime mover 92 to the traction wheels and the implement such as the snow blower. Only the belt 98 need be additionally connected between the two parts to complete the attachment for instance. Of course the controls such as the rods 163 and 176 are also connected along with a control rod 188 which connects to the hooked rod 69 for rotating the chute 74. The rod 188 has a knob 189 for rotation of the rod, and the latter is mounted by a support 191 on a panel 192 through a bolt 193. A grommet 194 is provided between the handle 188 and the support 191.

The rod 163 for clutching the drive wheel 138 connects to a control handle 196 pivotally mounted by a bolt 197 and nut 198 and washer 199 with respect to the support means 101. A knob 201 is connected to the top of the handle 196 and the handle extends through the panel 192 and of course the latter is attachable to the support means 101.

Likewise, the rod 176 has a rod 202 extended thereto and it connects to a handle 203 and has a bolt 204, washer 206, and nut 207 for mounting relative to the support means 101. A plunger 208 is employed and a pin 209, so that both cooperate with the handle 203, and there is an intervening spring 211. The upper end of the plunger 208 has a knob 212 and a cap 213. It will be noted that the pin 209 can be set in the openings 214 in the panel 192. Finally, the engine throttle assembly 216 is mounted on the panel 192 by the bolt 217, washers 218, and nut 219 along with lockwasher 221. Also a steering handle 222 with hand grips, such as the grip 223, is secured to the support means 101 by bolts, such as the bolt 224.

Thus with the arrangement mentioned, the attachment can be readily made with respect to the support means 101 and the drive transmission of power therebetween is effected. Further, the several controls described, namely the rotatable chute control through the handle 188, and the traction wheel clutch control through the rod 163, and the speed control through the rod 176, are all shown to be attachable through simple socket type connections where the ends of the control rods 163 and 176 slip into the linkages 159 and 169 respectively and are secured thereto by cotter pins or the like. Thus these control connections are readily and easily made.

FIGS. 2 and 3 show a projection 226 secured to the support means 101 to serve as an abutment to the fork 166 which has an arm 227 integral therewith. The projection 226 is disposed to engage the arm 227 when the drive wheel 138 is in a plane on the axis of the pulley 33. Thus the drive wheel 138 cannot be placed in rolling contact with the pulley 33 on the center of the latter, and therefore the transmission or drive cannot be placed in a neutral position which would cause the disc 33 and wheel 138 to rotate without transmitting power and therefore wear the two, unbeknown to the operator. Also, the wheel 138 cannot be inadvertently shifted from one side of the pulley 33, where the traction wheels would be driven say in a forward direction, to the other side of the disc 33, where the traction wheels would be driven then in the reverse direction. The projection 226 prevents these occurrences.

While a specific embodiment of this invention has been shown and described, it should be obvious that certain changes could be made in the embodiment and the invention should therefore be determined only by the scope of the appended claims.

What is claimed is:

1. A power unit and a powered attachment combination, comprising a prime mover, support means for supporting said prime mover, ground wheels mounted on said support means for movably supporting the latter, a drive wheel being rotatably mounted on said support means and operatively connected to said ground wheels for driving the latter, an attachment including both a movably mounted working implement and a rotatably mounted disc with the latter two operatively connected and with said disc having a flat face disposed to rotate in a plane transverse to the plane of rotation of said drive wheel and being in rolling contact therewith, said drive wheel being movable both along and transverse to the face of said disc for selective positioning with respect to said disc, abutting matching portions respectively on said support means and said attachment, attaching means for releasably connecting said support means and said attachment, drive means connected between said prime mover and said disc for rotating the latter and with said drive means being disconnectable for separation of said attachment from said support means, said abutting matching portions and said drive wheel and said disc all being located to place the latter two in rolling contact when said abutting matching portions are connected together, and controls connected to said drive wheel for selective positioning of the latter along the face of said disc and also into and out of rolling contact with said disc.

2. A power unit and a powered attachment combination, comprising a prime mover, support means for supporting said prime mover, ground wheels mounted on said support means for movably supporting the latter, a drive wheel rotatably mounted on said support means and operatively connected to said ground wheels for driving the latter and with said drive wheel being movably mounted on said support means for displacement in the plane of rotation of said drive wheel, resilient means connected between said drive wheel and said support means for urging said drive wheel to move in one direction in said plane of rotation, an attachment including both a movably mounted working implement and a rotatably mounted disc with the latter two operatively connected together and with said disc being oriented for rotation in a plane transverse to the plane of rotation of said drive wheel and having a face in rolling contact with said drive wheel and to the side thereof in said one direction of the resilient urging of said drive wheel, abutting matching portions on said support means and said attachment and arranged to abut together upon moving said attachment in the direction opposite said one direction and in a position to yieldingly urge said drive wheel against said disc, attaching means for releasably connecting said support means and said attachment, drive means connected between said prime mover and said disc for rotating the latter and with said drive means being disconnectable for separation of said attachment from said support means, said abutting matching portions and said drive wheel and said disc all being located to place the latter two in resiliently urged rolling contact when said abutting matching portions are connected together.

3. A power unit and a powered attachment combination, comprising a prime mover, support means for supporting said prime mover, ground wheels mounted on said support means for movably supporting the latter, a drive wheel rotatably and axially shiftably mounted on said support means and operatively connected to said ground wheels for driving the latter, an attachment including both a movably mounted working implement and a rotatably mounted disc with the latter two operatively connected and with said disc being disposed to rotate in a plane transverse to the plane of rotation of said drive wheel and in rolling contact therewith, control means for axially shifting said drive wheel for selective positioning along said disc and on both sides of the center of said disc for selective drive speeds of said ground wheels and forward and reverse drives thereof, means on said support means and operatively associated with said control means for spacing said drive wheel from said disc when said drive wheel is aligned with the axis of said disc, abutting matching portions respectively on said support means and said attachment, attaching means for releasably connecting said support means and said attachment, drive means connected between said prime mover and said disc for rotating the latter and with said drive means being disconnectable for separation of said attachment from said support means, said abutting matching portions and said drive wheel and said disc all being located to place the latter two in rolling contact when said abutting matching portions are connected together.

4. A powered implement and tractor combination comprising a tractor including a prime mover and ground wheels for movably supporting said tractor, a drive wheel rotatably and axially shiftably mounted on said tractor and being movable on said tractor in the plane of rotation of said drive wheel and being operatively connected to said ground wheels for driving the latter, an implement releasably bolted to said tractor, a rotatably mounted pulley included in said implement and being disposed to rotate in a plane transverse to the plane of rotation of said drive wheel and in rolling contact therewith, resilient means on said tractor for urging said drive wheel into rolling contact with said pulley, control means for axially shifting said drive wheel for selective positioning along said pulley and on both sides of the axis of rotation of said pulley for selective drive speeds of said ground wheels and forward and reverse drives thereof, and a belt connected between said prime mover and said pulley for rotating the latter.

5. A power unit and a powered attachment combination, comprising a prime mover, support means for supporting said prime mover, ground wheels mounted on said support means for movably supporting the latter, a drive wheel rotatably mounted on said support means and operatively connected to said ground wheels for driving the latter, an attachment including both a movably mounted working implement and a rotatably mounted pulley with the latter two operatively connected together and with said pulley having a flat face disposed to rotate in a plane transverse to the plane of rotation of said drive wheel and in rolling contact therewith, connecting portions on said support means and said attachment, attaching means for releasably connecting said connecting portions, a drive belt operatively connected between said prime mover and said pulley for rotating the latter and with said drive belt being disconnectable for separation of said attachment from said support means, said drive wheel being displaceable both along and transverse to said face of said pulley to be driven thereby at different speeds and to clutch therewith, control means connected to said drive wheel for displacing the same relative to said pulley, and resilient means operative between said pulley and said drive wheel for yieldingly urging the latter two into rolling contact.

References Cited

UNITED STATES PATENTS

| | | | |
|---|---|---|---|
| 2,076,056 | 4/1937 | Woodford | 56—25.4 |
| 2,474,524 | 6/1949 | Hainke | 56—25.4 |
| 2,546,339 | 3/1951 | Greer. | |
| 2,847,770 | 8/1958 | Wright | 37—43 X |
| 2,942,487 | 6/1960 | Claus | 74—197 |
| 3,052,048 | 9/1962 | Fiske | 37—43 |

ABRAHAM G. STONE, *Primary Examiner.*

R. L. HOLLISTER, *Assistant Examiner.*